April 17, 1962
R. F. MERSHON ET AL
3,030,012
SINE-COSINE INTEGRATOR
Filed July 7, 1958
3 Sheets-Sheet 1
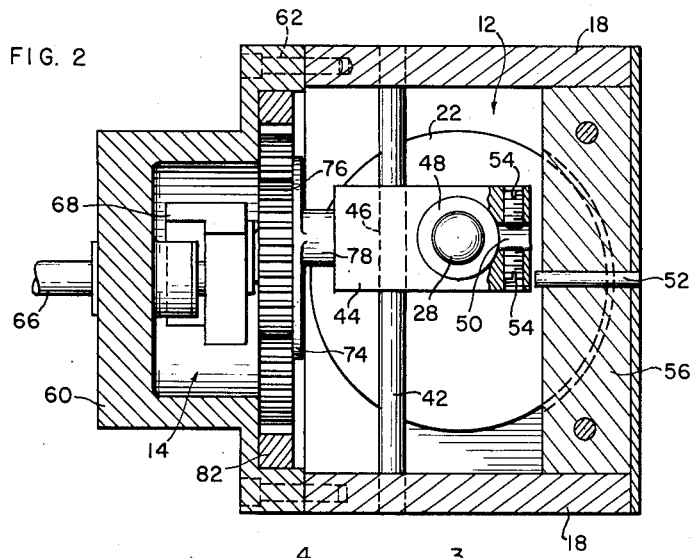
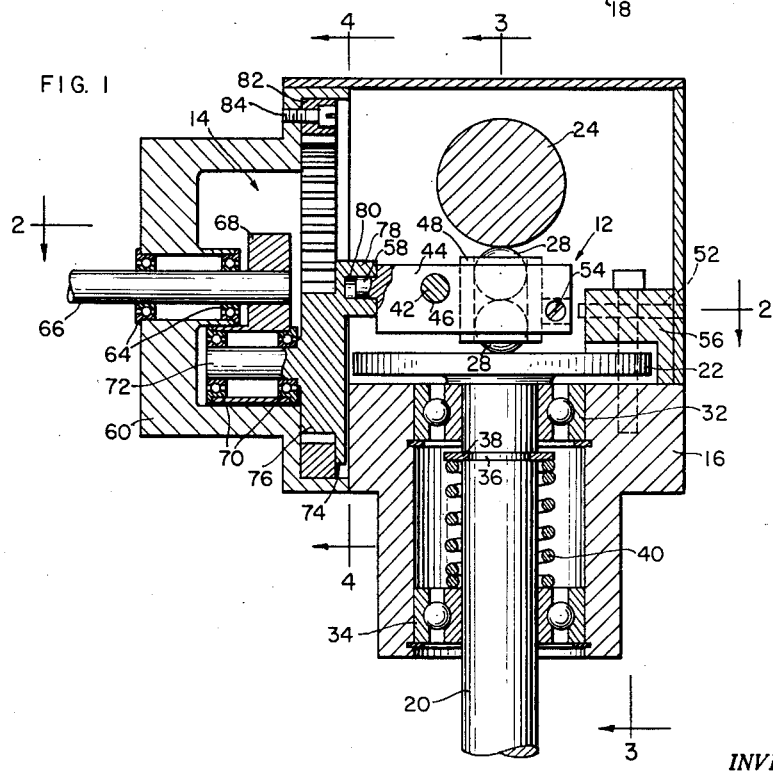
INVENTOR.
RALPH F. MERSHON
WILLARD J. OPOCENSKY
BY
ATTORNEY

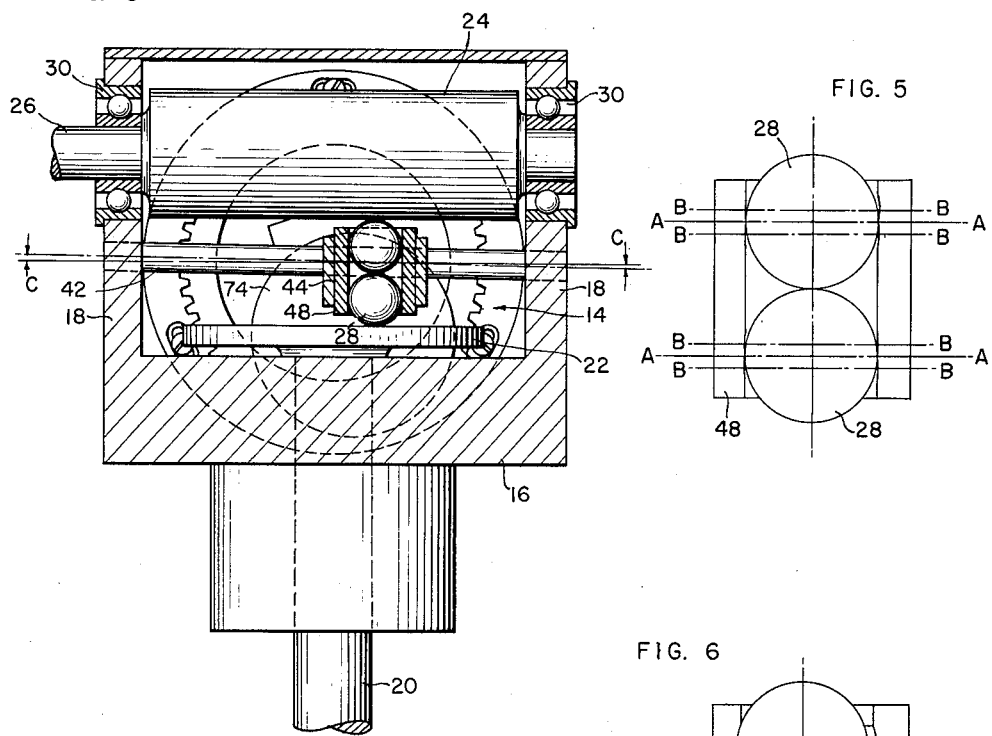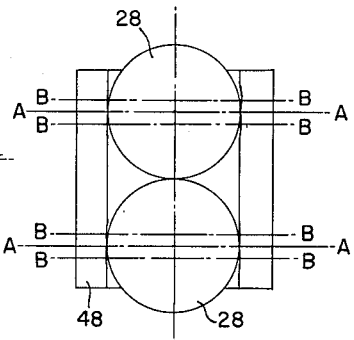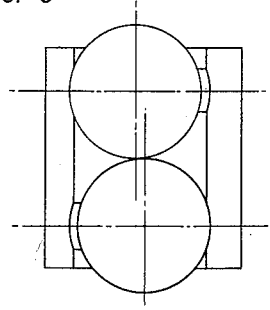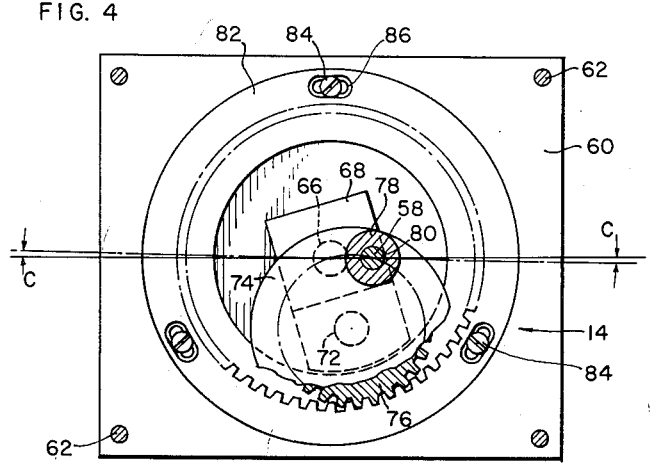

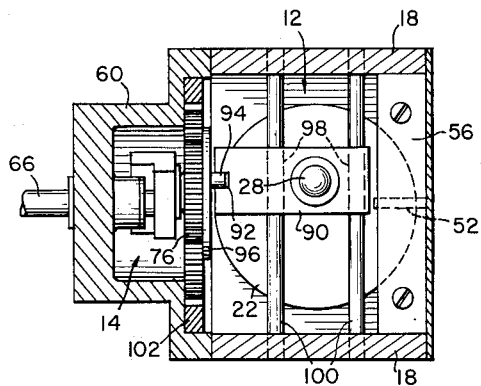
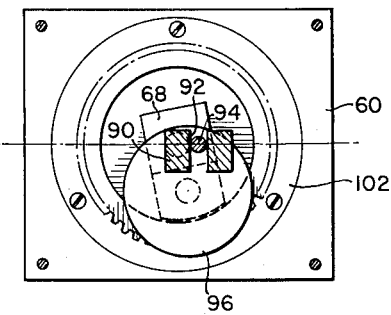
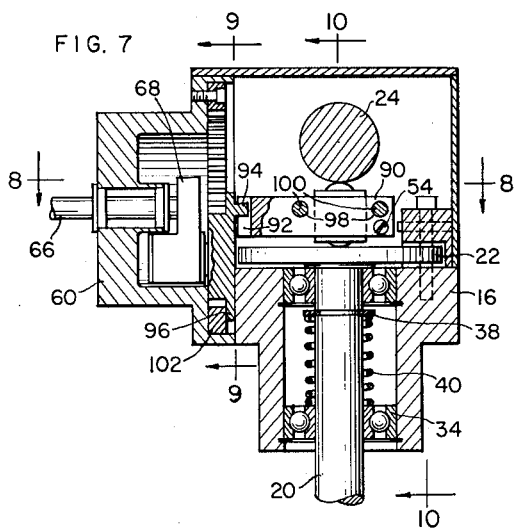
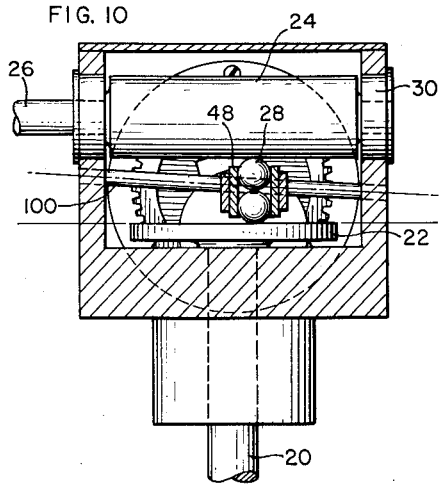
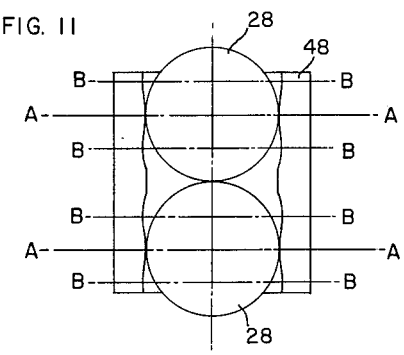

United States Patent Office 3,030,012
Patented Apr. 17, 1962

3,030,012
SINE-COSINE INTEGRATOR
Ralph F. Mershon, Burbank, and Willard J. Opocensky, Glendale, Calif., assignors to General Precision Inc., a corporation of Delaware
Filed July 7, 1958, Ser. No. 746,976
15 Claims. (Cl. 235—61)

This invention relates to a computing sine-cosine and integrator mechanism combined in one unit.

The design of present computers requires compactness of components to save space, also components must maintain extreme accuracy under temperature variations.

Precise relationship between the various mechanisms and their respective parts is of primary importance, particularly in a computing integrator having a torque transmitting means employing a pair of balls in an adjustable carriage. In a device of this particular nature, inaccuracies are most likely to occur due to frictional wearing of the carriage which allows malposition of the torque transmitting balls.

Heretofore, sine-cosine mechanism and computing integrators were separate components having the output of the sine-cosine mechanism introduced into the computing integrator by a means such as a link. Such arrangement of these components required more space and subjected each the sine-cosine mechanism, the integrator mechanism and the interconnecting means to different temperatures. This condition created variations of the components resulting in ambiguous values of such components.

The present invention provides a sine-cosine and integrator of a construction that permits packaging both mechanisms in one compact unit, wherein the output of the sine-cosin mechanism is connected directly to the ball carriage of the integrator. Unitary construction of these mechanisms provides a thermal stability which will increase the accuracy thereof. Also means are provided to reciprocate the ball carriage to distribute the wear therein, to less critical areas leaving the most critical central areas free from wear thus maintaining a correct position of the torque transmitting balls at the most critical central transmitting position.

One object of this invention is to package a sine-cosine mechanism and an integrator in one compact unit.

Another object of this invention is to package a sine-cosine mechanism and an integrator mechanism in one unit having the output of the sine-cosine connected directly to the ball carriage of the integrator.

A further object is to reciprocate the ball carriage of an integrator whereby the major wearing of such ball carriage is distributed over a less critical area.

A still further object of this invention is to provide a "zeroing" adjustment to co-ordinate the "zero" position of the sine-cosine output and the ball carriage of the integrator.

Still another object is to provide a "pin and slot" connection between the output of the sine-cosine mechanism and integrator ball carriage whereby the reciprocation of such ball carriage may be independent of the sine-cosine output position.

These objects and such other objects that may hereinafter appear, will become apparent from the following description of preferred embodiments of the present invention as shown in the accompanying drawings, in which:

FIGURE 1 is a longitudinal section of a sine-cosine and integrator combined in one unit, embodying the present invention;

FIGURE 2 is a plan section taken on the line 2—2 of FIGURE 1;

FIGURE 3 is a longitudinal section taken on the line 3—3 of FIGURE 1;

FIGURE 4 is a section taken on the line 4—4 of FIGURE 1;

FIGURE 5 is a semi-diagrammatical view of a pair of torque transmitting balls and the manner in which frictional wear is distributed in the guide sleeve;

FIGURE 6 is a similar view of the prior art and illustrates the manner in which frictional wear is concentrated at one point;

FIGURE 7 is a longitudinal section similar to FIGURE 1 illustrating a modified form of this invention;

FIGURE 8 is a plan section taken on the line 8—8 of FIGURE 7;

FIGURE 9 is a section taken on the line 9—9 of FIGURE 7;

FIGURE 10 is a section taken on the line 10—10 of FIGURE 7; and

FIGURE 11 is a semi-diagrammatical view similar to FIGURE 5 illustrating a wider distribution range of frictional wear.

Referring to the accompanying drawings, the preferred embodiment illustrated in FIGURES 1 through 5, comprises a computing integrator mechanism indicated generally by the numeral 12 and a sine-cosine mechanism indicated generally by the numeral 14.

The computing integrator 12 is a conventional form of an integrator, and is similar to that shown and described in U.S. Patent Number 2,602,338, issued to Willard Opocensky on July 8, 1952.

The integrator 12 consists essentially of a housing 16 having side walls 18, front and top walls complete the enclosure. The integrating mechanism 12, enclosed in housing 16, comprises an input shaft 20 having a rotatable disk 22 secured on its inner end, a rotatable cylinder 24 provided with an output shaft 26, and a pair of contacting torque transmission balls 28.

Cylinder 24 is supported by a pair of suitable bearings 30 in side walls 18 shown in FIGURE 3. Input shaft 20 is supported by a pair of suitable bearings 32 and 34 mounted in the housing 16. The input shaft 20 is also provided with an annular groove 36 which retains a thrust washer 38. A compression spring 40, positioned between bearing 34 and thrust washer 38, provides a constant pressure between disk 22, balls 28 and cylinder 24, insuring a positive frictional driving engagement between these elements.

A guide rod 42 is positioned, through the housing 16, at an angle to the face of disk 22, with its ends secured in side walls 18 of housing 16. A ball carriage 44 is disposed between disk 22 and cylinder 24 and is provided with an angularly disposed aperture 46 which is complimentary to, and slidably engages guide rod 42. Ball carriage 44 is also provided with a fixed sleeve 48 which precisely retains the pair of torque transmitting balls 28 in an axis normal to the face of disk of 22.

Ball carriage 44 is also provided with an aperture 50 which aligns approximately with a pin 52 in the "zero" position of ball carriage 44. Aperture 50 is somewhat larger than pin 52 and is provided with a pair of diametrically opposed set screws 54 which are threaded through tapped holes in carriage 44 and are adapted to engage the pin 52. Pin 52 is frictionally retained in an aperture in a bridge support 56 which is rigidly secured to the housing 16. Ball carriage 44 is further provided with a projecting pin 58, the function of which will be hereinafter fully described. Axis of pin 58 intercepts the axis of angular aperture 46 and the axis of contacting balls 28.

Heretofore integrators having a ball carriage, developed inaccuracies due to the wear in their retaining sleeves from the torque transmitting balls 28. Such wear is caused by the increased rate of rotation of the balls when on the peripheral areas of the disk. When such wear occurs, the balls will assume the position showing in FIG- URE 6. In such position the misalignment of the balls will result in an ambiguous transfer of information between the disk and cylinder. Also when the direction of the disk rotation is reversed, balls 28 will reverse their position creating backlash resulting in a further error in the transfer of information between disk and cylinder. A further disadvantage of the condition shown in FIGURE 6 is that it would be impossible to indicate a "zero" position of the ball carriage.

Ambiguity is the least critical in the peripheral areas of the disk, where the major wearing of the retaining sleeve occurs, and is most critical in the central area of the disk where the minimum wear of retaining sleeve occurs. This invention takes advantage of this condition by positioning the worn portion of the sleeve to be adjacent to the balls when they are in the peripheral areas of the disk where alignment of such balls is least critical and positioning the least worn portion of the retaining sleeve adjacent to the balls where the alignment of such balls is most critical.

For the positioning of the ball carriage and retaining sleeve for accomplishing the above condition, a simple and unique device is employed to reciprocate such ball carriage and sleeve. As heretofore mentioned, the guide rod 42 is disposed at an angle to the surface of disk 22 (as viewed in FIGURE 3). The aperture 46 in carriage 44 is disposed at the same angle as rod 42 and is free to slide thereon. In the "zero" position of the carriage 44 and balls 28, i.e. the center line of balls 28 are aligned with center of disk 22, no motion is imparted to balls 28 from disk 22. As the carriage progresses, toward either periphery of the disk, it will ascend or descend under the influence of rod 42. Concurrently the rotation of the balls 28 will increase proportionately as the carriage moves in either direction of the center of disk 22. Thus it will be seen that no wear will occur in the sleeve at the "zero" position of the carriage which is equivalent to the position A—A in FIGURE 5. In this position the balls 28 will make full contact with the sleeve 48 which will maintain the common axis of balls 28 normal to the face of disk 22 and axis of cylinder 24 assuring a true transmission of torque in the critical central area of the disk. A further advantage of reciprocating the ball carriage and sleeve is that wear will be distributed approximately one half of the total amount to each side of the central position of each ball as indicated by the positions B—B and B—B in FIGURE 5.

When the ball carriage is moved to the least critical peripheral area of the disk the relative position of the sleeve 48 to the balls 28 will be at line B—B of FIGURE 5. In this position any wear in the sleeve, that may occur, will be adjacent to the balls 28 at the least critical position of the ball carriage.

Although a preferred form of a disk, ball and cylinder integrator is shown and described, it is apparent that a reciprocating ball carriage may be employed in other forms of integrators such as in a disk to disk and cylinder to cone.

The sine-cosine mechanism 14 is a conventional form of mechanism and consists essentially of a housing 60 secured to the integrator housing 16 by screws 62. Housing 60 is provided with suitable bearings 64 for supporting a sine-cosine input shaft 66. An arm 68 is secured on the inner end of shaft 66, and is provided with a pair of bearings 70 in the free end thereof. A stub shaft 72 is journaled in bearings 70 and is provided with a concentric disk 74 and pinion 76. The periphery of disk 74 is provided with an integral hub 78 having a socket 80. The axis of socket 80 is coincidental with the pitch line of pinion 76, and is adapted to receive pin 58 of ball carriage 44.

An internal ring gear 82 is secured in the sine-cosine housing 60 by screws 84 and is capable of rotational adjustment by provision of arcuate slots 86 for the screws 84. The pitch diameter of the internal gear 82 is twice that of the pitch diameter of the meshing pinion 76, and is concentric with the input shaft 66.

A representative device is shown in U.S. Patent 2,754,687, issued July 17, 1956, to Brandon.

"Zero" setting of the sine-cosine mechanism is accomplished by placing the ball carriage in a central position on the integrator disk 22. The front cover plate is removed and pin 52 pushed in to engage aperture 56. Positioning of carriage 44 is accomplished by adjusting set screws 54 into engagement with each side of pin 52 and the exact "zero" setting is determined when no transmission of torque occurs between disk 22 and cylinder 24. The "zero" of carriage 44 is then registered in the position of the input shaft 66 of sine-cosine mechanism 14.

After "zero" positioning the carriage 44, the straight line linear movement of the axis of sine-cosine output socket 78, and coincidentally the integrator ball carriage pin 58, is adjusted to an angle coincident with the angle of guide rod 42 by rotating the internal ring gear 82 to the desired position and securing in place by screws 84. The coincidental angles of the sine-cosine output 78 and guide rod 42 is clearly illustrated by comparison of FIGURES 3 and 4 wherein the axis of guide rod 42 and path of sine-cosine output are represented by a dot-dash line and a relative plane represented by a solid line parallel to the face of disk 28 and axis of cylinder 30, and the angular difference represented by the angles "C."

FIGURES 7 through 11 illustrate a modified form of a sine-cosine and integrator. In this form the essential difference is in the connection between the sine-cosine and integrator and the angle guide rods for the ball carriage.

In this modified form, the ball carriage 90 is provided with a slot 92 which is engaged by a pin 94 mounted on the periphery of sine-cosine concentric disk 96 in a manner similar to socket 80. Ball carriage 90 is also provided with a pair of apertures 98 which slideably receive a pair of guide rods 100. The rods 100 are secured in the side walls of the integrator housing at an angle to the face of integrator disk greater than that shown for the preferred form, as may be noted by comparing FIGURES 3 and 10.

The pin and slot connection permits a true sine-cosine function to be introduced to the ball carriage 90 as may be evidenced by reference to FIGURE 9. The pin and slot connection also permits the guide rods to be disposed at a greater angle without introducing a sine-cosine error, and which will distribute the major wear in the ball sleeve at "B" in FIGURE 11 at a greater distance from the critical point "A" which will result in a greater degree of accuracy in the critical central area of the disk.

No adjustment is provided for the internal ring gear 102 as it is unnecessary to adjust the path of the sine-cosine pin 94 to match the rise and fall of ball carriage 90.

The remaining structure of the sine-cosine and integrator mechanism and their functions are the same as that shown and described for the preferred form, identical parts having identical reference numerals.

It is to be understood that various changes in structure and form can be resorted to without departing from the spirit of this invention as set forth in the appended claims.

We claim:

1. In combination a sine-cosine mechanism, an integrating mechanism and a housing, combining said mechanisms into one unit, an output member on said sine-cosine mechanism, a ball carriage in said integrator mechanism connected directly to said output member, said integrator comprising an input disk, a cylindrical output member and a pair of torque transmitting balls disposed in driving engagement between said input disk and said output cylinder, said balls being supported by said ball carriage, said ball carriage having an aperture therein, a ball carriage guide in said housing disposed at an angle to the face of said input disk, said ball carriage slideably engaging said guide whereby lateral movement of said carriage imparts a reciprocal motion to said carriage in a plane parallel to the common axis of said balls coincidentally with the lateral movement of said carriage, said sine-cosine mechanism comprising an internal ring gear having slots therein, mounting screws in said housing engaging said slots whereby the output travel path of said sine-cosine mechanism may be adjusted to coincide with the travel path of said carriage and said sine-cosine output may be adjusted to a "zero" position, a ball carriage positioning means comprising a pin slideably retained in said housing adapted to engage said aperture in said ball carriage, said pin being relatively smaller than said aperture, a pair of diametrically opposed set screws on each side of said aperture in said ball carriage adapted to engage opposite sides of said pin whereby the position of said ball carriage may be adjusted and held in position by said screws.

2. In a sine-cosine integrator the improvement comprising a housing, an integrating mechanism having a ball carriage adapted to be connected directly to a sine-cosine output member, said integrator comprising an input disc, a cylindrical output member and a pair of torque transmitting balls disposed in driving engagement between said input disc and said output cylinder, said balls being supported by said ball carriage, said ball carriage having an aperture therein, a ball carriage guide in said housing disposed at an angle to the face of said input disc, said ball carriage slideably engaging said guide whereby lateral movement of said carriage imparts a reciprocal motion to said carriage in a plane parallel to the common axis of said balls coincidentally with the lateral movement of said carriage, a ball carriage positioning means comprising a pin slideably retained in said housing and adapted to engage said aperture in said ball carriage, said pin being relatively smaller than said aperture, a pair of diametrically opposed set screws on each side of said aperture in said ball carriage adapted to engage opposite sides of said pin whereby the position of said ball carriage may be adjusted and held in position by said screws.

3. In a sine-cosine integrator the improvement comprising a housing, a sine-cosine mechanism, an output member on said sine-cosine mechanism, said sine-cosine mechanism comprising an internal ring gear having slots therein, mounting screws in said housing engaging said slots whereby the output travel path of said sine-cosine mechanism may be adjusted to coincide with the travel path of an integrating mechanism carriage and said sine-cosine output may be adjusted to zero position.

4. An analog computing device comprising a housing having two perpendicular input shafts and an output shaft extending through the walls of said housing, an integrating mechanism mounted in said housing having a rotatable input member connected to one of said input shafts, a rotatable output member mounted in said housing and connected to said output shaft, said input and output members being juxtaposed with their adjacent straight line surfaces substantially parallel, a ball carriage having a pair of balls rotatably supported in contact with said surfaces of said input and output members, a guide for said carriage limiting linear movement of the centers of said balls to a plane through the axis of said input and output members, and a positive gear drive sine-cosine mechanism mounted in said housing and connected to the other of said input shafts, said sine-cosine mechanism having an output means moving in a straight line diametrically with respect to its input shaft and in the path of travel of said carriage, said sine-cosine output means being directly connected to said ball carriage for movement thereof along said guide, and means for compensating for misalignment between said sine-cosine output and said carriage movement.

5. An analog computing device as set forth in claim 4 wherein said sine-cosine mechanism is adjustably mounted for rotation to vary the inclination of said straight line movement with respect to the movement of said carriage along said guide.

6. An analog computing device as set forth in claim 4 wherein a pin and slot connection is provided between said sine-cosine output means and said carriage to permit relative movement therebetween in a direction parallel to a line through the centers of said balls.

7. An analog computing device as set forth in claim 4 wherein said sine-cosine mechanism comprises an internal ring gear, an arm mounted on said other input shaft, a pinion gear rotatably mounted on said arm and revolving about said other input shaft in meshing engagement with said ring gear, said output means being mounted on said pinion gear at the pitch line thereof, and said ring gear is adjustably mounted for rotation to vary the inclination of said straight line movement with respect to the movement of said carriage along said guide.

8. An analog computing device comprising a housing having two perpendicular input shafts and an output shaft extending through the walls of said housing, an integrating mechanism mounted in said housing having a rotatable input member connected to one of said input shafts, a rotatable output member mounted in said housing and connected to said output shaft, said input and output members being juxtaposed with their adjacent straight line surfaces substantially parallel, a ball carriage having a pair of balls rotatably supported in contact with said surfaces of said input and output members, a guide for said carriage inclined with respect to said surfaces and limiting linear movement of the centers of said balls to a plane through the axis of said input and output members, and a positive gear drive sine-cosine mechanism mounted in said housing and connected to the other of said input shafts, said sine-cosine mechanism having an output means moving in a straight line diametrically with respect to its input shaft and in the path of travel of said carriage, said sine-cosine output means being directly connected to said ball carriage for movement thereof along said inclined guide, whereby said carriage is also moved in a direction parallel to a line through the centers of said balls to vary the bearing surfaces therebetween, and means for compensating for misalignment between said sine-cosine output and said carriage movement.

9. An analog computing device comprising a housing having at least one input shaft extending through the walls of said housing, a positive gear drive sine-cosine mechanism mounted in said housing and connected to said input shaft, said sine-cosine mechanism having an output means moving in a straight line diametrically with respect to its input shaft and adapted to move in the path of travel of the ball carriage of an integrating mechanism also mounted in said housing and be directly connected thereto, said sine-cosine mechanism being adjustably mounted for rotation to vary the inclination of said straight line movement with respect to the movement of said carriage.

10. An analog computing device comprising a housing having at least one input shaft and output shaft extending through the walls of said housing, an integrating mechanism mounted in said housing and having a rotatable input member connected to one of said input shafts, a rotatable output member mounted in said housing and connected to said output shaft, said input and output members being juxtaposed with their adjacent straight line surfaces substantially parallel, a ball carriage having a pair of balls rotatably supported in contact with said surfaces of said input and output members, a guide for said carriage inclined with respect to said surfaces and limiting linear movement of the centers of said balls to a plane through the axes of said input and output members, means on said carriage adapted to be directly connected to another output member having a straight line movement for movement of said ball carriage along said inclined guide, whereby said carriage is also moved in a direction parallel to a line through the centers of said balls to vary the bearing surface therebetween.

11. An analog computing device comprising a housing having at least one input shaft extending through the walls of said housing, a positive gear drive sine-cosine mechanism mounted in said housing and connected to said input shaft, said sine-cosine mechanism having an output means moving in a straight line diametrically with respect to its input shaft and adapted to move in the path of travel of the ball carriage of an integrating mechanism also mounted in said housing and be directly connected thereto, said sine-cosine mechanism having an internal ring gear, an arm mounted on said input shaft, a pinion gear rotatably mounted on said arm and revolving about said input shaft in meshing engagement with said ring gear, said output means being mounted on said pinion gear at the pitch line thereof, said ring gear being adjustably mounted for rotation to vary the inclination of said straight line movement with respect to the movement of said carriage.

12. An analog computing device comprising a housing having two input shafts and an output shaft extending therethrough mutually perpendicular to each other, an integrating mechanism having an integrating disc mounted on one of said input shafts, an output cylinder mounted on said output shaft and spaced above said integrating disc and extending diametrically thereof, a ball carriage having a pair of balls rotatably supported in contact with said disc and said cylinder, and a guide for said carriage limiting linear movement of the centers of said balls to a plane through the axis of said cylinder and perpendicular to said disc, a positive gear drive sine-cosine mechanism mounted on the other of said input shafts and having an output means moving in a straight line diametrically with respect to its input shaft, said sine-cosine output means being directly connected to said ball carriage for movement thereof along said guide, and means for compensating for misalignment between said sine-cosine output and said carriage movement.

13. An analog computing device as set forth in claim 12 wherein a pin and slot connection is provided between said sine-cosine output means and said carriage to permit relative movement therebetween in a direction perpendicular to said disc.

14. An analog computing device as set forth in claim 12 wherein said sine-cosine mechanism is adjustably mounted for rotation to a position where said straight line movement is parallel to the movement of said carriage along said guide.

15. An analog computing device comprising a housing having two input shafts and an output shaft extending therethrough mutually perpendicular to each other, an integrating mechanism having an integrating disc mounted on one of said input shafts, an output cylinder mounted on said output shaft and spaced above said integrating disc and extending diametrically thereof, a ball carriage having a pair of balls rotatably supported in contact with said disc and said cylinder, and a guide for said carriage inclined with respect to said disc and limiting linear movement of the centers of said balls to a plane through the axis of said cylinder and perpendicular to said disc, a positive gear drive sine-cosine mechanism mounted on the other of said input shafts and having an output means moving in a straight line diametrically with respect to its input shaft, said sine-cosine output means being directly connected to said ball carriage for movement thereof along said inclined guide, whereby said carriage is also moved perpendicular to said disc relative to said balls to vary the bearing surfaces therebetween, and means for compensating for misalignment between said sine-cosine output and said carriage movement.

References Cited in the file of this patent

UNITED STATES PATENTS

| 2,228,068 | White | Jan. 7, 1941 |
| 2,286,297 | Merrick | June 16, 1942 |
| 2,351,394 | Bristol | June 13, 1944 |
| 2,385,952 | Svoboda | Nov. 2, 1945 |
| 2,754,687 | Brandon | July 17, 1956 |
| 2,912,161 | Knapp | Nov. 10, 1959 |
| 2,923,468 | Rappaport | Feb. 2, 1960 |

FOREIGN PATENTS

| 89,205 | Austria | Aug. 25, 1922 |